United States Patent [19]
Norling

[11] Patent Number: 5,954,575
[45] Date of Patent: *Sep. 21, 1999

[54] ARRANGEMENT FOR AUTOMATED HANDLING OF A CARCASS AND PARTS SEPARATED THEREFROM AT MACHINE-ASSISTED CUTTING AND BONING

[75] Inventor: Lars-Erik Norling, Ängelholm, Sweden

[73] Assignee: ConAgra, Inc., Omaha, Nebr.

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,228
[22] PCT Filed: Nov. 6, 1995
[86] PCT No.: PCT/SE95/01305
§ 371 Date: May 7, 1997
§ 102(e) Date: May 7, 1997
[87] PCT Pub. No.: WO96/13982
PCT Pub. Date: May 17, 1996

[30] Foreign Application Priority Data

Nov. 8, 1994 [SE] Sweden ................................. 9403814

[51] Int. Cl.⁶ .................................................. A22C 15/00
[52] U.S. Cl. ........................... 452/187; 452/141; 452/177
[58] Field of Search ................... 452/149, 187, 452/141, 177

[56] References Cited

U.S. PATENT DOCUMENTS

| | | | |
|---|---|---|---|
| 2,285,999 | 6/1942 | Murphy | 17/44 |
| 2,470,878 | 8/1949 | Tate | 452/187 |
| 3,488,025 | 1/1970 | Rowland | 452/187 |
| 3,748,146 | 7/1973 | Anderson et al. | 452/149 |
| 3,774,265 | 11/1973 | Anderson et al. | 452/149 |
| 3,940,830 | 3/1976 | Anderson et al. | 452/149 |
| 4,985,963 | 1/1991 | Norling | 452/187 |

FOREIGN PATENT DOCUMENTS

| | | | |
|---|---|---|---|
| 1035005 | 11/1956 | Germany | A22B 7/00 |
| 0440175 | 7/1985 | Sweden | A22C 17/00 |
| 0457226 | 12/1988 | Sweden | A22B 7/00 |

*Primary Examiner*—Willis Little
*Attorney, Agent, or Firm*—Pretty, Schroeder & Poplawski

[57] ABSTRACT

The invention relates to an arrangement for automated handling of a carcass and parts separated therefrom in mechanically assisted cutting and boning. In mechanically assisted cutting and boning, a hook or similar must be applied manually into the part to be separated. According to the present invention, the hook application is located so as not to delay the operator performing the cutting and the boning. The arrangement comprises a conveyor line (5) for transport of the carcasses suspended from a first hook (2), from a preparatory work station to a work station for separation of a part (3) from the carcass. A second hook (4) is applied into said part (3) of the carcass at the preparatory work station and is transported to the work station together with the carcass (1).

12 Claims, 1 Drawing Sheet

ARRANGEMENT FOR AUTOMATED HANDLING OF A CARCASS AND PARTS SEPARATED THEREFROM AT MACHINE-ASSISTED CUTTING AND BONING

TECHNICAL AREA

The present invention relates to an arrangement allowing automated handling of a carcass and parts separated therefrom. In machine-assisted cutting and boning, a hook or similar has to be applied manually into the part to be separated. This might cause a bottle-neck in the production, especially if the application would be made at an inconvenient stage of the process. According to the present invention, the hook application is located so as not to delay the operator performing the cutting and the bone removal. This means that the whole process can be automated still further.

STATE OF THE ART

Arrangements for the handling of carcasses are previously known. They generally consist of a line for transporting the carcasses, hanging from a first hook, from a preparatory work station to a work station for the separation of a part from the carcass. At the work station, a counter-hold tool is used, commonly in the shape of a hook. The application of the counter-hold hook into or onto the part to be separated has up to now been difficult to automate in a cost-efficient way, depending on the carcasses varying in size, orientation and in individual properties. Today, this has lead to a typical work procedure where the operator with his hands first collects an empty hook from a hook supply nearby, applies the hook into or onto the part to be separated, starts the equipment which is to move the carcass away from the counter-hold hook or vice versa, after which he waits for the separation to reach the point where he can start to cut. Today, this process takes 10–20 seconds out of a total processing cycle of generally 40–60 seconds in most cases.

For cutting lines with high capacity demands, processing e.g. 1,000 animal carcasses per shift or about 500 quarters per hour, a time loss of 10–20 seconds per quarter may result in the mechanizing of the cutting process being unprofitable. The actual application of the counter-hold hook in the part to be separated only takes a few seconds in itself, but the total time loss becomes approximately ten times longer due to the necessary preceding and succeding operations, including the time waiting for the stretching of the carcass/counter-hold hook before the knife-work can start.

The present invention solves the above problem partly by the application of the counter-hold hook into or onto the part to be separated being made by another operator at a preceding work station or preparatory work station, and partly by the hook and the rest of the counter-hold arrangement being so designed as to ascertain a correct counter-hold position, whether the counter-hold equipment is stationary or mobile. The waiting time, until the stretching between the carcass and the counter-hold hook has been achieved so that cutting can start, is eliminated completely by performing the stretching while the carcass and the counter-hold hook is transported to the work station.

After the counter-hold hook has been applied to the carcass it is transported automatically to the work station with its two hooks applied—the hook from which the carcass is normally always suspended as well as the counter-hold hook. This allows the automation of the entire process described above, except for the application of the counter-hold hook.

SUMMARY OF THE INVENTION

The present invention thus provides an arrangement for the handling of slaughtered carcasses comprising a line for transportation of carcasses suspended from a first hook, from a preparatory work station to a work station for the separation of a part from the carcass. According to the invention, a second hook can be applied to said part at the preparatory work station and be transported to the work station together with the carcass.

The invention is described in closer detail in the accompanying claims.

BRIEF DESCRIPTION OF THE DRAWINGS

The invention will now be described in detail with reference to the accompanying drawings, in which.

DETAILED DESCRIPTION OF PREFERRED EMBODIMENTS

The principle of separating a certain part of a carcass from the carcass itself, by counter-hold hooks and pushing or pulling forces, is performed in practice either by applying the counter-hold hook into the part to be separated or by applying it onto the carcass so as to hold it in a fixed position. In the first case, the carcass is subjected to the pushing or pulling force so as to move away from the counter-hold hook. In the second case the part to be separated is subjected to a force moving away from the carcass.

The first case could be called a stationary counter-hold case and the second a mobile counter-hold case. In both cases, the location should be selected, and the application of the hook, the gripping equipment etc. itself, in the present patent application referred to as the counter-hold hook, should be made, with extreme care on or in the part of the carcass to be separated. Whether the counter-hold hook is stationary or mobile, the separated part will, after separation from the carcass, be hanging from it. In order to obtain an efficient separation, to avoid tearing damage to the meat and to avoid the counter-hold hook and the carcass being pulled upward in the vertical plane, rendering the cutting work more difficult, it is very important that the counter-hold hook applies, during the separation, its force on the part to be separated in a controlled manner regarding its position in the vertical plane. After separation, it is important that the counter-hold hook is not placed too low, allowing the separated part to come into contact with the floor, and that said hook can be transported together with its load away from the separating station.

In both the above cases, said conditions for the counter-hold device are fulfilled by first applying the counter-hold hook into or onto the part to be separated, and then hanging said hook on a line section, the position of which is adapted to the location on the carcass of the part to be separated. The counter-hold hook and the line section thus constitute the counter-hold device.

Figure 1:
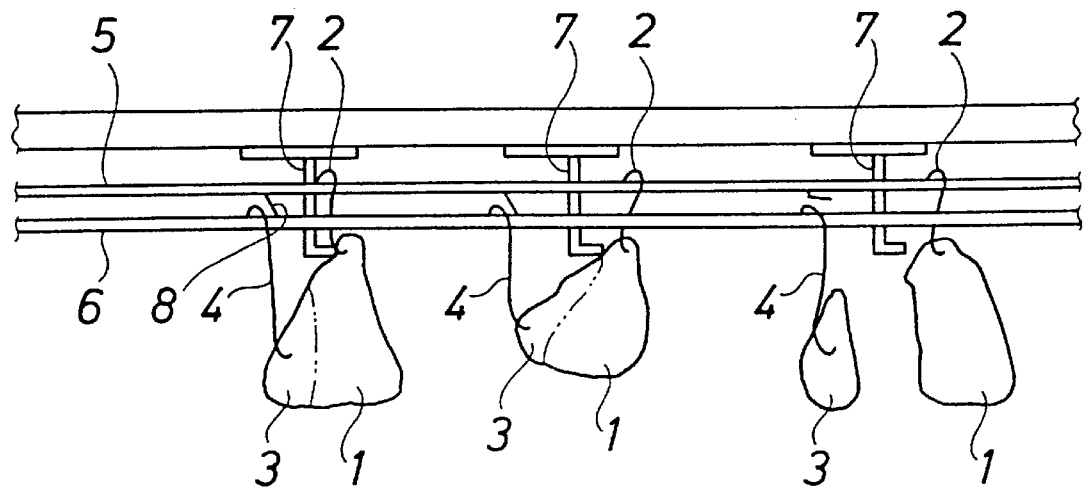
FIG. 1 is a schematic side view of an arrangement according to the invention having a stationary counter-hold is hook.

FIG. 1 shows a first embodiment of the invention, in which the counter-hold device is stationary. The figure shows a separation process from left to right in three stages. The carcass 1 is suspended from a transport hook 2 whereas the part 3 to be separated has been prepared by attaching a counter-hold hook 4 to a suitable location on the carcass. In the figure, the transport hook is hanging from a transport line 5 whereas the counter-hold hook 4 is suspended from a counter-hold line 6. The lines 5 and 6 may, as an alternative, be the same line, as discussed below.

The carcass 1 has been transported from a preparatory station (not shown). The preparatory station may also be a preceding work station. According to the object of the present invention, the principal thing is that the counter-hold hook 4 is applied manually into the part 3 and is hung onto the line 6 so, that the carcass can be transported together with both hooks 2 and 4 to the work station. The counter-hold hook may also be transported from the preparatory station to the work station hanging solely from the carcass, and be caught automatically at the work station or at another suitable location. If necessary, a buffer zone is located between the preparatory station and the work station to control the timing of the carcasses arriving to the work station.

In the first step, the carcass 1 has been conveyed to the work station. A stopper 8 holds the counter-hold hook stationary. The hook stopper 8 is arranged to hold the counter-hold hook 4 in such a way that it cannot be turned upwards in the vertical plane. This is a prerequisite of obtaining a controlled separation movement. In the next step, the separation begins. The transport hook 2 is moved to the right and may also be assisted by a support arm 7 moving together with the transport hook 2. The control of the transport hook is adjusted so as not to tear the meat apart, should the operator not start cutting. Only now the operator starts working, and the whole procedure before this point has been automatic. In the final step, the part 3 and the carcass 1 are shown separated. If another separation is to be performed, this operator takes a new counter-hold hook (not shown), attaches it to an appropriate part of the carcass and hangs it, where appropriate, onto a line for further transportation to the next work station.

Figure 2:
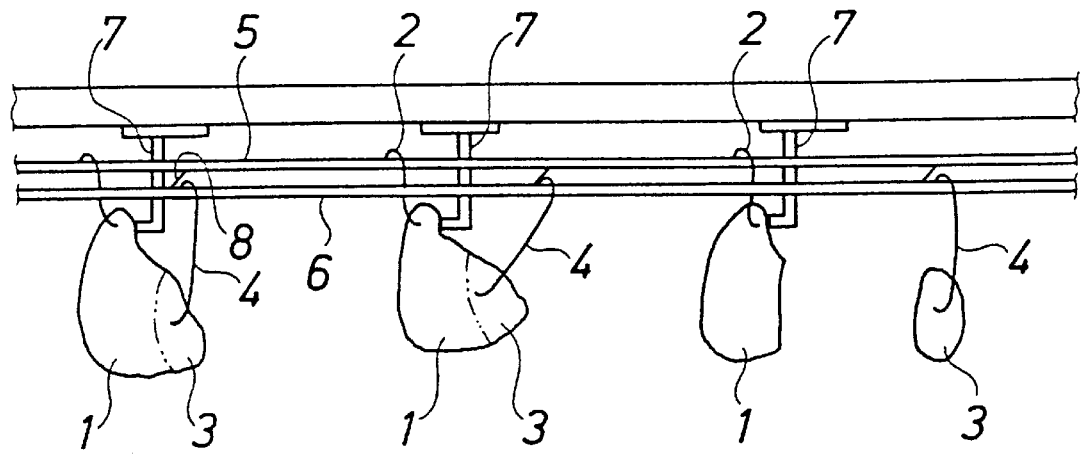
FIG. 2 is a corresponding view of a mobile counter-hold hook.

FIG. 2 shows a second embodiment of the invention where the counter-hold device, contrary to the above described embodiment, is mobile. In FIG. 2, corresponding parts have the same reference numerals as in FIG. 1. The transport hook 2 and the arm 7 are thus held stationary, whereas the counter-hold hook 4 is retained by a hook stopper and can be given a controlled movement. The counter-hold hook may also be placed on a carrier (not shown), as described in my Swedish patent application No 9302447-9. The counter-hold line 6 may also have a special design shape in order to obtain a controlled movement. It will be evident to the person skilled in the art that the rest of the work procedure will be the same as for the embodiment in FIG. 1.

The figures show separate lines for the transport hook and the counter-hold hook. It is also possible to have the hooks suspended from the same conveyor line. As the hooks always come in the same order, they can be separated by providing suitable stoppers on the lines. Alternatively, the hooks may be transported on the same line between the preparatory station and the work station, but one hook is lifted to a separate line at the actual work station.

As indicated in the figures, the counter-hold hook 4 is generally longer than the transport hook 2. The relative lengths are adapted individually according to the type of slaughtered carcass and the part to be separated.

The counter-hold hooks can also be of the type allowing automatic release of the separated part. It is also favourable if a return line (not shown) is provided for return transport of the counter-hold hooks to a suitable location of the cutting line.

I claim:

1. A method for transporting a carcass between a preparatory station and a work station and for dividing the carcass at the work station comprising the steps of:

providing first and second conveyers that extend in a generally horizontal direction between the preparatory station and the work station;

providing a transport hook that is moveably attached to the first conveyor;

providing a counter-hold hook that is moveably attached to the second conveyor;

suspending the carcass from the transport hook;

attaching the counter-hold hook to the carcass while the carcass is located at the preparatory station;

conveying the carcass from the preparatory station toward a work station;

imparting a force between the transport hook and counter-hold hook thereby biasing the hooks apart and placing the portion of the carcass between the hooks in tension; and, cutting the carcass at a location between the hooks thereby dividing the carcass into a first part that remains suspended from the transport hook and a second part that becomes suspended from the counter-hold hook;

wherein the weight of the carcass is sustained by the transport hook at the preparatory station whereby the counter-hold hook can be attached to the carcass without requiring the carcass weight to be shifted to the counter-hold hook at the time of attachment; and, wherein the second conveyor is located at a lower vertical elevation than the first conveyor thereby causing the counter-hold hook to impart a significantly horizontal force onto the carcass when the hooks are biased apart;

whereby the elevational deviation between the first and second conveyers reduces the amount that the carcass would be otherwise lifted, as well as the distance that the hooks would otherwise be biased apart, if the same force were applied between hooks attached to conveyers of the same elevation.

2. The method of claim 1 wherein the step of biasing the hooks apart is accomplished by holding the counter-hold hook at a static position on the second conveyer while simultaneously applying a horizontal force to the transport hook in a parallel to the first conveyer and away from the counter-hold hook.

3. The method of claim 1 wherein the step of biasing the hooks apart is accomplished by holding the transport hook at a static position on the first conveyer while simultaneously applying a horizontal force to the counter-hold hook in a direction parallel to the first conveyer and away from the transport hook.

4. The method of claim 2 wherein the applied force is insufficient to tear the meat between the hooks.

5. The method of claim 3 wherein the applied force is insufficient to tear the meat between the hooks.

6. The method of claim 1 wherein the second conveyer is located at a high enough vertical elevation that the second part of the carcass can freely hang from the counter-hold hook after the carcass has been divided.

7. An apparatus for transporting a carcass between a preparatory station and a work station and for preparing the carcass to be divided at the work station comprising:

first and second conveyers that extend in a generally horizontal direction between the preparatory station and the work station;

a transport hook moveably attached to the first conveyor for suspending the carcass and transporting the carcass from the preparatory station and the work station;

a counter-hold hook moveably attached to the second conveyor for attaching the carcass to the second conveyer at the preparatory station; and, means for biasing the hooks apart to place a portion of the carcass between the hooks in tension, said biasing means positioned between the preparatory station and the work station;

wherein the counter-hold hook extends to a low enough position at the preparatory station that it can be attached to the carcass without bearing a significant portion of the weight of the carcass;

wherein the second conveyor is located at a lower vertical elevation than the first conveyor thereby causing the counter-hold hook to impart a significantly horizontal force onto the carcass when biasing means is applied to the hooks and, wherein the carcass can be cut between the hooks at the work station thereby dividing the carcass into a first part that remains suspended from the transport hook and a second part that becomes suspended from the counter-hold hook;

whereby the elevational deviation between the first and second conveyers reduces the amount that the carcass would be otherwise lifted, as well as the distance that the hooks would otherwise be biased apart, if the same force were applied between hooks attached to conveyers of the same elevation.

8. The apparatus of claim 7 wherein the biasing means comprises:

means for holding the counter-hold hook at a static position on the second conveyer; and, means for applying a horizontal force to the transport hook in the direction away from the counter-hold hook when the counter-hold hook is stopped.

9. The apparatus of claim 7 wherein the biasing means comprises:

means for holding the transport hook at a static position on the first conveyer; and, means for applying a horizontal force to the counter-hold hook in the direction away from the transport hook when the transport hook is stopped.

10. The apparatus of claim 8 wherein the force applied between the hook is insufficient to tear the meat between the hooks.

11. The apparatus of claim 9 wherein the force applied between the hook is insufficient to tear the meat between the hooks.

12. The apparatus of claim 9 wherein the second conveyer is located at a high enough vertical elevation that the second part of the carcass can freely hang from the counter-hold hook after the carcass has been divided.

* * * * *

UNITED STATES PATENT AND TRADEMARK OFFICE
CERTIFICATE OF CORRECTION

PATENT NO.  :  5,954,575

DATED       :  September 21, 1999

INVENTOR(S) :  Lars-Erik Norling

It is certified that error appears in the above-identified patent and that said Letters Patent is hereby corrected as shown below:

Col. 4, line 46, before the word "parallel" insert -- direction --

Signed and Sealed this

Sixteenth Day of May, 2000

Attest:

Q. TODD DICKINSON

*Attesting Officer*         *Director of Patents and Trademarks*